United States Patent [19]

Adamski et al.

[11] Patent Number: 4,982,606

[45] Date of Patent: Jan. 8, 1991

[54] FLUID LEVEL SENSOR AND CONTROLLER

[75] Inventors: Joseph R. Adamski, Sudbury, Mass.; Donald A. Coates, Green Lake, Wis.

[73] Assignee: Raytheon Company, Lexington, Mass.

[21] Appl. No.: 319,380

[22] Filed: Mar. 6, 1989

[51] Int. Cl.$^5$ .................... G01F 23/26; G01R 27/26
[52] U.S. Cl. .................. 73/304 C; 137/387; 307/118; 324/624
[58] Field of Search ............ 73/304 C; 361/284; 137/387; 324/624

[56] References Cited

U.S. PATENT DOCUMENTS

| | | | |
|---|---|---|---|
| 2,506,143 | 5/1950 | Edelman | 73/304 C X |
| 2,560,757 | 7/1951 | Bowar | 73/304 C |
| 2,805,371 | 9/1957 | Dye | 361/284 |
| 2,824,270 | 2/1958 | Anderson | 361/284 |
| 2,996,915 | 8/1961 | Greenwood et al. | |
| 3,343,415 | 9/1967 | Johnston | |
| 3,397,715 | 8/1968 | Fathauer | |
| 3,524,116 | 8/1970 | Bray | 361/284 |
| 3,553,575 | 1/1971 | Shea | |
| 3,950,653 | 4/1976 | Kirkpatrick | 361/284 X |
| 4,122,718 | 10/1978 | Gustafson | |
| 4,173,892 | 11/1979 | Khurgin | |
| 4,245,188 | 1/1981 | Rottmar | 361/284 X |
| 4,399,699 | 8/1983 | Fujishiro | 73/304 C |
| 4,603,581 | 8/1986 | Yamanoue et al. | |
| 4,674,329 | 6/1987 | Mulder | |

FOREIGN PATENT DOCUMENTS

| | | |
|---|---|---|
| 0616272 | 1/1949 | United Kingdom |
| 1359799 | 7/1974 | United Kingdom |
| 1531290 | 11/1978 | United Kingdom |
| 1604103 | 2/1981 | United Kingdom |
| 2086054 | 5/1982 | United Kingdom |
| 2127552 | 4/1984 | United Kingdom |

*Primary Examiner*—Daniel M. Yasich
*Attorney, Agent, or Firm*—William R. Clark; Richard M. Sharkansky

[57] ABSTRACT

A fluid level sensor for determining the amount of liquid in a container. Thin metal plates are placed parallely adjacent each other to form a capacitor cell coated with a non-hygroscopic film. The plates are mounted on the walls of the container containing fluid. As the fluid covers more surface area of the capacitor plates, the dielectric properties of the fluid increase the capacitance of the cell proportionally. The plates are connected to an oscillator whose output frequency varies with the change in container fluid levels. By monitoring these frequency changes, the container fluid levels of the fluid in the container can be controlled.

18 Claims, 5 Drawing Sheets

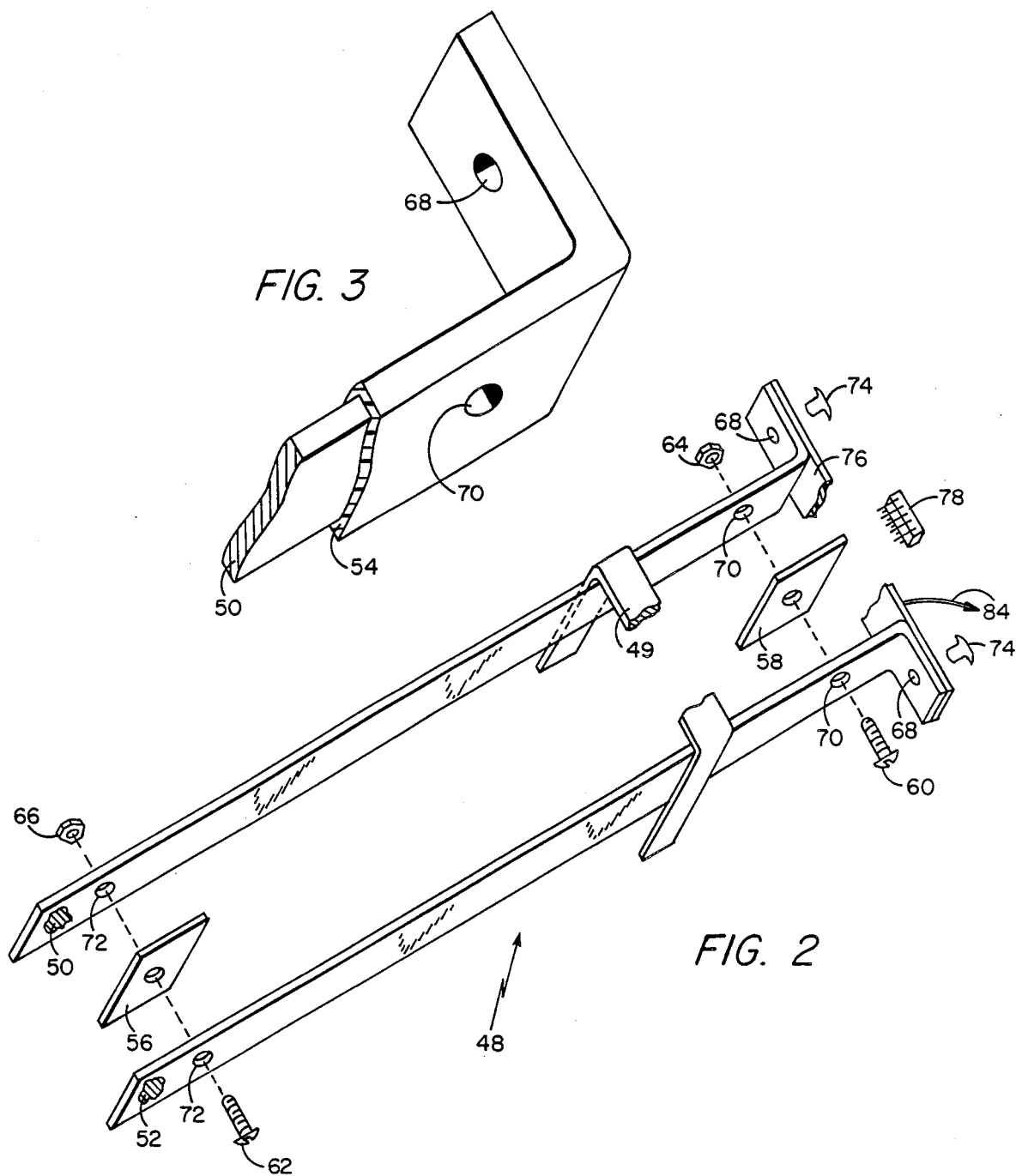

FLUID LEVEL SENSOR AND CONTROLLER

BACKGROUND OF THE INVENTION

The present invention relates to a fluid level sensor and controller, and more particularly relates to an improved apparatus for measuring, detecting, and controlling liquid levels within a washing machine.

Liquid level sensors for washing machines currently in use comprises two tubes. Each tube having one end connected to the bottom of the washing machine tub and the other end connected to a pressure sensitive switch. The first switch actuates a valve that controls the flow of water going into the washing machine. The second switch when depressed actuates a pump to drain water from the washing machine. As the water level within the washing machine increases, the water within each tube increases, causing the net air pressure over atmospheric pressure to push against the pressure sensitive switch. When the water level in the first tube rises so that the air pressure reaches a set value, the sensing switch toggles and the water flow into the machine is shut off. To drain water from the machine, a pump is turned on. As the water drains, the air pressure in the second tube drops, depressing the second sensing switch, causing a signal to be sent to turn off the pump. By turning the water going into the washing machine and the drain pump off and on, the level within the washing machine can be set.

One problem with this liquid level sensor is that the switch is mechanical and may wear out with use. A mechanical sensor may leak air pressure over time if allowed to remain pressurized. This can cause flooding and subsequent water damage. Another drawback is that the pressure sensitive switch may not have the sensitivity to set the water level with accuracy. Furthermore, the second pressure sensation may not be able to detect when pressure in the second tube is below atmospheric level. Accordingly, the second switch depresses when water is still present in the tub. Consequently, the pump must continue to drain water from the tub for a time period thereafter. Further, this liquid level sensor requires mechanical parts which may be expensive to use and assemble. This liquid level sensor also does not continuously signal the liquid level to a controller but instead indicates only a preset level.

Other methods to sense the liquid level in a tub include a capacitance liquid level sensor. A typical capacitance liquid level sensor comprises a metal rod coated with an insulating material such as Teflon, forming one electrode of a capacitor and a tub wall forming a second electrode of the capacitor. A signal with appropriate RF oscillation is applied across the two electrodes so as to be able to detect and amplify changes in capacitance. These changes provide an output that indicates the liquid level or provides an alarm if the liquid level exceeds a predetermined threshold.

This arrangement suffers from various drawbacks. For example, this arrangement can only be used in tubs which are made of conductive material. Otherwise, additional capacitive elements would have to be provided. This arrangement has further drawbacks in that when used with liquids that contain sticky materials, a build-up on the wires or rods occurs, which results in an inaccurate output indication.

Another liquid level sensor is described in U.S. Pat. No. 4,122,718. A pair of wires are encased in Teflon or an equivalent material. The wires are placed parallel to each other and are spaced equidistantly therein with the Teflon material closed at the terminating end of the liquid level sensor. One drawback of this arrangement is that when the wires are used in a turbulent tub to maintain a constant spacing between the wires, they must be installed within a tube made from a rigid material. A further drawback of this invention is that soap or film may form on the wires and this can possibly affect the capacitance and oscillation frequency of the sensor. A further drawback is that wires do not provide enough surface area to get an accurate capacitance without the addition of more complicated circuitry. This drawback may prevent the indicator from sensing liquid levels down to such small amounts as ¼ of an inch.

Another drawback of capacitance sensors is that they can be effected by noise and stray capacitance. The capacitor sensor is typically located in the washing machine tub and wired to the capacitance sensing circuitry located a few feet away. The capacitance of the wires changes during washing machine operation as the tub vibrates, resulting in the wires moving around. Accordingly, the sensing circuitry is susceptible to the stray capacitance of the wires between the capacitor sensor and the sensing circuitry. Further, due to the noise generated by the washing machine motor, the output signal of the capacitance circuitry can give erroneous data. Accordingly, due to the noise of the washer motor and turbulence caused by the washer agitator, the accuracy and stability of the sensing apparatus can be affected.

SUMMARY OF THE INVENTION

It is an object of the present invention to provide an improved fluid level sensor and controller.

It is another object of the invention to provide a fluid level sensor and controller having simple construction and thus offering easy installation, maintenance, high-reliability, and high-speed response.

It is further an object of the invention to provide a liquid level sensor with improved performance in a washing machine container where the liquid has high turbulence.

It is also an object of this invention to provide a liquid level sensor that has minimal susceptibility to film or other materials that are used in a washing machine.

It is an additional object of this liquid level sensor to provide an apparatus that can detect level changes of less than ¼ of an inch.

It is another object of the present invention to provide a liquid level sensing apparatus and controller that changes the amount of liquid in the container where the sensor is located in response to the changes of capacitance between the probes of the sensor.

It is an additional object of the present invention to provide a liquid level sensor that is small enough to be used in a washing machine.

These and other objects of the invention are obtained generally by providing an apparatus for sensing the level of liquid in a container comprising first and second parallel metal plates having opposingly facing flat surfaces, means for supporting the plates inside the container, spacing means, attached to the first and second plates for maintaining a constant spacing between the first and second plates, and a capacitance sensing means coupled to the plates for generating a signal indicating the level of liquid in the container. It may be preferable that the sensing apparatus further comprise a coating means for encasing the metal plates and having a thickness of less than ⅛ of an inch to prevent soap film from adhering to the sensor. It may also be preferable that the capacitance sensing means be attached to the top of the first and second plates to reduce sensitivity to stray noise and capacitance. It is further preferable that the capacitance sensing means comprises a means for generating a frequency proportional to the level of the liquid in the container to track the amount of liquid in the container without complicated circuitry. It is further preferable that the plates be spaced close enough to each other so as to provide a predetermined sensitivity and spaced far enough away from each other so that any film from the liquid is prevented from being clogged between the plates.

The invention may further be practiced by a capacitive probe for sensing the level of liquid within a washing machine tub comprising a first and second parallel metal plate having opposingly facing flat surfaces having constant spacing of less than ⅛ inch, means for supporting the plates within the washing machine tub, a corrosive resistive material encasing the first and second parallel metal plate having a thickness of less than ⅛ of an inch. The capacitive probe also comprises an insulating spacing means attached between the first and second plate for maintaining a constant spacing between the first and second plates and a capacitive sensing means attached to the first and second plates for generating a frequency proportional to the level of liquid in the container. It may be preferable that the plate is coated with a Teflon material having a thickness less than 1/100th inches so that the Teflon materials dielectric strength has little effect of the total capacitance of the capacitive probe.

The invention may also be practiced by the method of sensing liquid flowing into a washing machine comprising the steps of positioning a first and second parallel metal plate having opposingly facing flat surfaces in substantially vertical position within the liquid within the machine, encasing the plates in a non-corrosive material, maintaining a constant spacing between the first and second plates of less than ⅛ inch, sensing the capacitance between the first and second plate and generating a frequency signal proportional to the level of liquid in the container in response to the capacitance sensed. It may be preferable that the method further comprise the step of changing the flow of liquid into the washing machine in response to the frequency signal. It may also be preferable that the method further comprise the steps of positioning a circuit board on the metal plate the contains circuitry that senses the capacitance between the first and second plate, and generates the frequency signal. It is further preferable that the method further comprise the step of maintaining a constant spacing between the first and second plate to prevent a film within the liquid from becoming clogged within the plates. It is also preferable that the method further comprise the steps of determining the time period of the frequency signal, comparing the time period to a prestored value, and changing the flow of liquid into the washing machine in response to the comparison.

BRIEF DESCRIPTION OF THE DRAWINGS

FIG. 2 shows a perspective view of the sensing apparatus shown in FIG. 1;

FIG. 3 shows a sectioned perspective view of the probe for the sensing apparatus shown in FIG. 2;

DESCRIPTION OF THE PREFERRED EMBODIMENT

Figure 1:
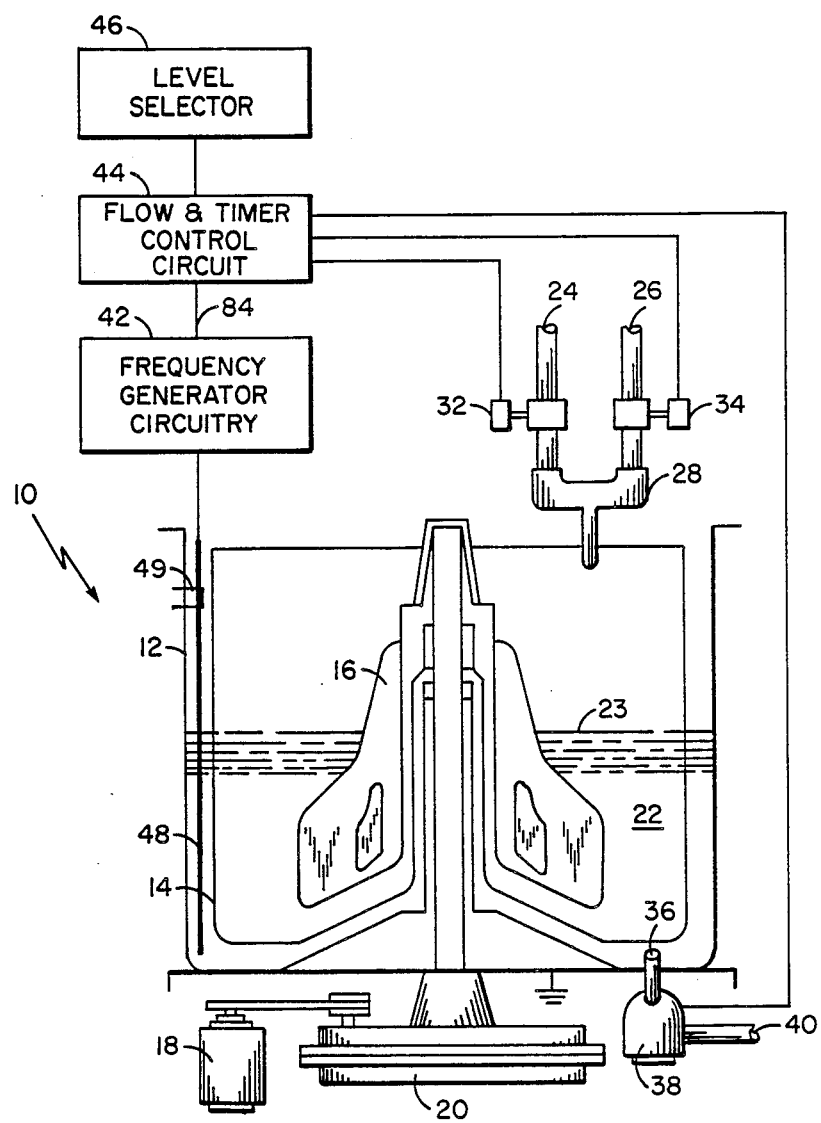
FIG. 1 shows a diagrammatic view of a washing machine showing a preferred embodiment of the present invention.

In the embodiment of the present invention shown in FIG. 1, an automatic washing machine 10 is shown having a water containing tub 12 electrically connected to ground, a clothes containing basket 14 mounted for rotation about a vertical axis, and an agitator 16 mounted centrally within the basket 14 for oscillation about the vertical axis. An electric motor 18 is arranged to drive selectively the basket 14 or the agitator 16 through a transmission 20. Water or liquid 22 is delivered to the tub 12 from hot and cold water supply pipes 24 and 26 through a mixing and shut-off valve 28. Soap suds or film 23 is generated during operation from detergent added at the beginning of the wash cycle. Valve 28 is actuated electrically through a solenoid means 32 and 34. A drain 36 is arranged at the bottom of tub 12. Drain 36 is connected to pump 38 that removes water from tub 12 through pipe 40.

An associated block diagram indicates that the electronic level control is provided which includes a frequency generation circuitry 42, a flow and timer control circuit 44, and a level selector 46 which can be adjusted to set the point at which the control circuit 44 enables solenoids 32 and 34 and pump 38 to turn on. The frequency generation circuitry 42 is connected to a liquid level sensor or probe 48 in the form of two cold rolled steel plates 50 and 52 (see FIG. 2) being coated with a corrosion resistive material 54 and being separated by a non-conductive material or spacers 56 and 58. The liquid level sensor 48 is disposed vertically between the substantially vertical wall of the tub 12 and the substantially vertical wall of the basket 14. The liquid level sensor 48 is used in conjunction with the liquid 22 in tub 12 to provide a capacitance to the frequency generation circuitry 42. The capacitance between the plates 50 and 52 of the liquid level sensor 48 will be equal to:

$$C = KA/D$$

where;

K equals the dielectric constant of the materials between the plates;

A equals the area of the plates; and

D equals the distance between the plates.

Thus, the capacitance between the plates 50 and 52 is a direct function of the dielectric constant K of the material between the two plates 50 and 52. As the depth or the level of liquid 22 in the tub 12 changes, a greater or lesser portion of the liquid level sensor 48 will have the higher dielectric constant of the liquid 22 between the plates 50 and 52 than will the portion above the liquid which is surrounded by air 53 (water has a dielectric constant of 81 as compared to air, which has a dielectric constant of 1, thus resulting in a significant difference in capacitance). As will be explained later, the effect of the coating 54 on the total capacitance is insignificant. As a result, the capacitance of the liquid level sensor 48 changes with a change in the liquid level, resulting in the frequency signal generated by the frequency generation circuitry 42 varying essentially linearly depending on the depth of the water or other liquid 22 in the tub 12 (see FIG. 5).

FIGS. 2 and 3 illustrate the liquid level sensor 48 that is shown in FIG. 1. The liquid level sensor 48 is vertically mounted to tub 12 with bracket 49. The sensor 48 contains first and second plates 50 and 52 separated by spacers 56 and 58. The spacers 56 and 58 can be constructed from any non-conducting material, but preferably has a high dielectric strength and is made from a rigid ceramic material. Connecting first plate 50 to ceramic spacers 56 and 58 and second plate 52 are screws 60, 62 and nuts 64, 66. Screws 60, 62 and nuts 64, 66 are preferably made from an insulating material such as plastic. Screw 60 is positioned near the top of liquid level sensor 48 and screw 62 is located near the bottom of liquid level sensor 48. Plates 50 and 52 each contain three holes 68, 70, 72; holes 70 and 72 for insertion of plastic screws 60 and 62 while hole 68 is for insertion a rivet 74.

Mounted on top of first and second plates 50 and 52 is circuit board 76. Mounted on circuit board 76 is frequency generation circuitry 42 including LM555 timer 78 and associated circuitry 96, 100 and 106 (shown in FIG. 4). Rivets 74 are driven through the circuit board 76 into the rivet hole 68 on the top of first and second plates 50 and 52. The rivets 74 provide an electrical contact for connecting the first and second plates 50 and 52 directly to circuit board 76. By riveting the circuit board 76 to first and second plates 50 and 52, the distance between the level sensor 48 and the frequency generation circuitry 42 is small. Further, there are no wires connecting the level sensor 48 to the frequency generation circuitry 42, which can move during washing machine 10 operation. Accordingly, the stray capacitance between the first and second plates 50 and 52 and circuit board 76 is minimized. Further, the noise within the washing machine tub 12 caused by both the agitator 16 and the electric motor 18, coupling into the frequency generation circuitry 42 and flow and timer control circuitry 44 is insignificant with respect to the frequency signal. Wire or line 84 connects circuit board 76 to the flow and timer control circuitry 44 located within the washing machine chassis (not shown). Vcc wire 86 and ground wire 88 connect to a power supply (not shown) within the washing machine chassis.

The first and second plates 50 and 52 are coated with a non-corrosive material 54. One such material is a fluoroplastic such as polytetrafluoroethylene (sold under the trademark "Teflon" by Dupont) or a modified ETFE (such as "TEFZEL" also sold by Dupont). The preferable thickness of this coating 54 is 0.0005 inches. The dielectric constant of the coating is approximately 2. Accordingly, the dielectric constant and total thickness are small enough so as not to affect the capacitance between the first and second plates 50 and 52. The coating 54 thickness is large enough to prevent corrosion of the metal plates 50 and 52 and to prevent soap film 23 from adhering to the metal plates 50 and 52.

When assembling the liquid level sensor 48, it is preferable that the ceramic spacers 56 and 58 maintain a distance between plates 50 and 52 of less than $\frac{1}{8}$ inch.

The ideal plate separation is between 1/16 and $\frac{1}{8}$ of an inch. It is recognized that having the distance between the plates 50 and 52 greater than 1/16 of an inch, soap film 23 from the liquid 22 in the washing machine tub 12 is prevented from collecting on the plates 50 and 52. If soap film 23 were to collect between the plates 50 and 52, the capacitance between the plates 50 and 52 could change. It is also recognized that by keeping the distance between the plates 50 and 52 less than $\frac{1}{8}$ inch, the frequency generation circuitry 42 provides a signal to the flow and timer control circuitry 44 that varies linearly with the liquid 22 in the tub 12 without being affected by the soap film 23. It is further recognized that keeping the distance (D) between the plates 50 and 52, small, liquid level sensor 48 maintains a sufficiently large sensor capacitance such that the dielectric caused by the soap film 23 is insignificant with respect to air and water.

The plates 50 and 52 are preferably $\frac{1}{2}$ inch wide, having a thickness of 1/50 to 1/10 of an inch. These plates dimensions enable the liquid level sensor 48 to fit within a standard washing machine tub 12. The preferred length of the plates 50 and 52 is 15 inches with a $\frac{1}{2}$ inch lip at the top. It is recognized that by having the plates 50 and 52 made from steel and being substantially rigid, the turbulence due to the water flowing in the washing machine tub 12 has little affect of the constant spacing between the plates 50 and 52. This further increases the sensitivity of the liquid level sensor 48.

It is further recognized that by maintaining the constant distance between the first and second plates 50 and 52 and coating the plates with a thin flouroplastic material such as Teflon 90, the liquid level sensor 48 capacitance remains substantially linear during washing machine operation.

Figure 4:
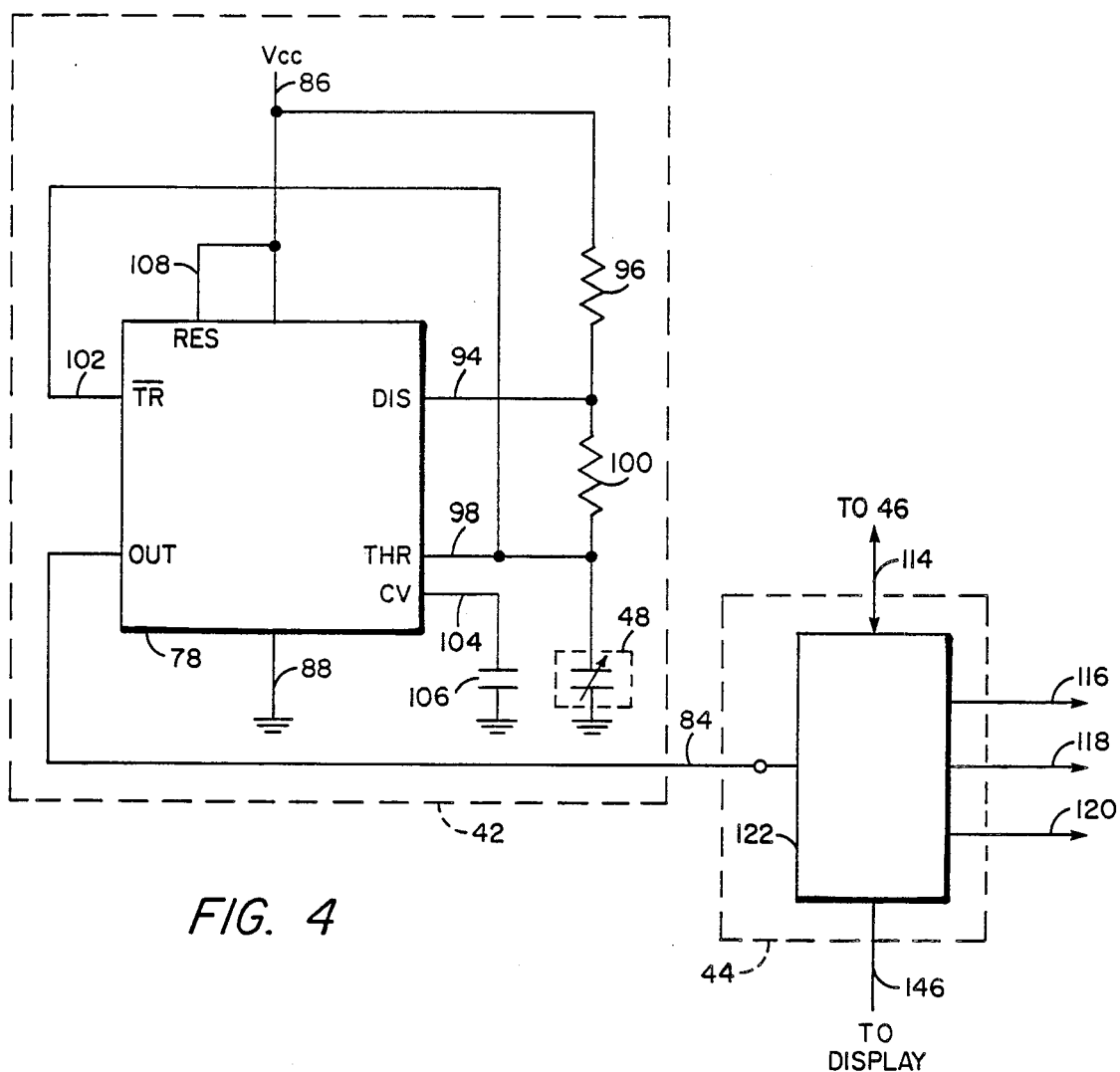
FIG. 4 shows a circuit diagram of the frequency generating circuitry built into the fluid level sensing apparatus shown in FIG. 2.

Referring to FIG. 4, there is shown a schematic of the frequency generation circuitry 42 which generates a frequency signal having a period proportional to the capacitance between the first and second plates 50 and 52, and the flow and timer control circuitry 44. Frequency generation circuitry 42 contains a LM555 Timer 78, manufactured by National Semiconductor Corporation of Santa Clara, California. Further information on the LM555 timer 78 chip is located in the National Semiconductor Corporation Linear Data Book, ©1982 which is hereby incorporated by reference. Flow and timer control circuitry 44 contains a microprocessor 122 such as a 68HC11, manufactured by Motorola Semiconductor of Austin, Texas.

Both frequency generation circuitry 42 and flow and timer control circuitry 44 are powered by a five volt power supply (not shown). Connected between the five volt power line (Vcc) 86 and the DIS (Discharge) pin 94 of the LM555 Timer 78 is resistor 96, here having 500K ohms resistance. Connected across the DIS pin 94 and the THR (Threshold) pin 98 of the LM555 Timer 78 is resistor 100, here having 62K ohms resistance. The THR pin 98 is connected to the TR* (Trigger) pin 102. Connected to THR pin 98 is plate 52 of the liquid level sensor 48. Plate 50 of the liquid level sensor 48 is connected to GND. The CV (Control Voltage) pin 104 of the LM555 Timer 78 is tied through or 0.01 F capacitor 106 to ground. The Reset pin 108 is tied to the Vcc line 86.

During operation, the LM555 timer 78 operates with well known principles and sets the frequency at its output in accordance with the capacitance between THR 98 and GND. Accordingly, LM555 timer 78 generates a frequency signal onto line 84 which varies proportionately to changes in the liquid level sensor 48 capacitance. Furthermore, the frequency signal will change with the fluid height in tub 12. Frequency generation circuitry 42 transmits the frequency signal through line 84 to flow and timer control circuitry 44. It is recognized that the frequency signal varies between GND and Vcc (typically 5 V) and the noise coupled to the frequency signal is typically around 100 mV. Hence, the frequency signal is substantially immune from noise from the washing machine motor 18.

Figure 5:
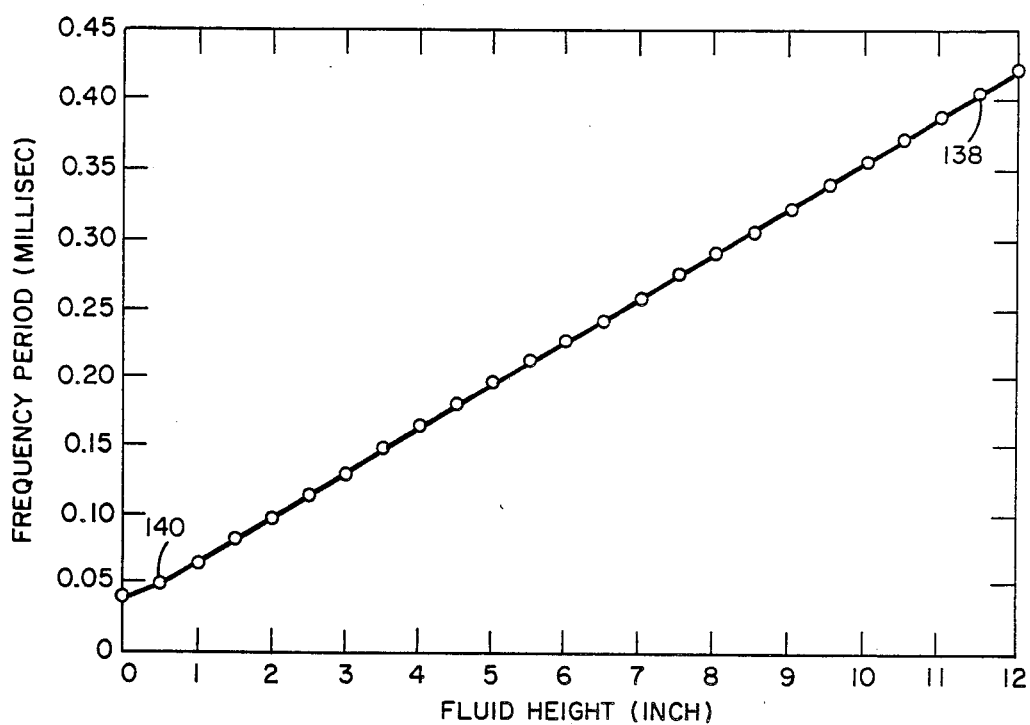
FIG. 5 shows a line graph of the frequency period versus fluid height for the frequency generating circuitry.

In FIG. 5, there is shown a graph of the frequency period of the frequency signal as a function of the fluid height in the tub 12. Point 138 indicates the relationship between the fluid height and the frequency signal period when the tub 12 is full and point 140 indicates the relationship when the tub 12 is empty.

Figure 6:
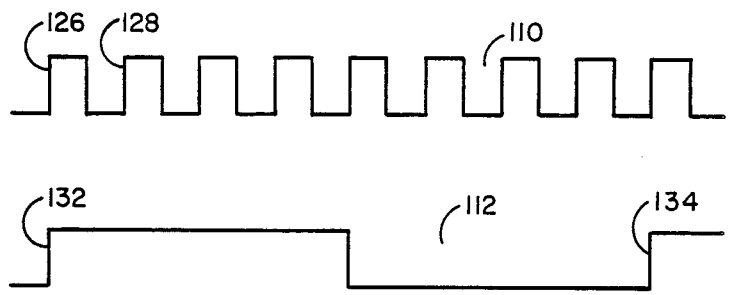
FIG. 6 shows frequency signals from the frequency generation circuitry for a washing machine having a high liquid level and low liquid level.

In FIG. 6, there is shown a frequency signal 110 corresponding to an empty tub and a frequency signal 112 corresponding to a full tub. As the fluid 22 level increases in tub 12, the period of the frequency signal decreases. It is recognized that the frequency signal varies linearly with the level of the fluid 22 in the tub 12. The period of the frequency signal may be adjusted by changing the resistance on resistor 96.

The Flow and Timer control circuitry 44 is connected to the Frequency Generation circuitry 42 through line 84, the level selector 46 through line 114, the hot and cold solenoids 32 and 34 through respective lines 116 and 118, and the drain pump 38 through line 120. Within the Flow and Timer control circuitry 44 is a microprocessor 122 and its associated circuit (not shown). The microprocessor 122 is connected to level selector 46 through line 114. Level selector 46 generates a signal onto line 114 having a value corresponding to a selected liquid level.

During washing machine operation, the microprocessor 122 enables solenoid means 32 and 34 to allow water to fill tub 12. The microprocessor 122 then determines when the liquid level has reached a preset height in tub 12 by sampling frequency signal on line 84, such as frequency signal 110. Rising edge 126 of frequency signal 110 indicates to the microprocessor 122 to start an internal timer (not shown). When the microprocessor 122 detects second rising edge 128, the microprocessor then reads the timer and compares the edge time (corresponding to the time between rising edges) to a value from the level selector 46. When the edge time is greater than or equal to the value from the level selector 46 (see point 138, FIG. 5), microprocessor 122 sends a signal to solenoids through line 116 and 118 to actuate solenoid means 32 and 34 to stop the liquid from entering the tub 12. Microprocessor 122 can also continuously send the sensed level data to a display or display controller (not shown) via data lines 146 to indicate to the operator the water level in the tub. This display may be an LED or LCD type that is well known. It is recognized by continuously monitoring the capacitance of sensor 48 as the liquid in the tub 12 is added or drained, an accurate level of liquid is the tub can be displayed at all times.

To drain liquid from the tub 12, the microprocessor 122 sends a signal through line 120 to turn on pump 38. Pump 38 then drains liquid from tub 12 through drain 36. The microprocessor 122 then samples the frequency signal such as frequency signal 112 and determines the time between rising edges 132 and 134. When the time between rising edges 132 and 134 is less than a prestored value (see point 140, FIG. 5), corresponding to time between frequency signal rising edges when no fluid is present in tub 12, the microprocessor 122 sends a signal through line 120 to turn off pump 38. This operation may be repeated throughout the wash cycle.

Figure 7:
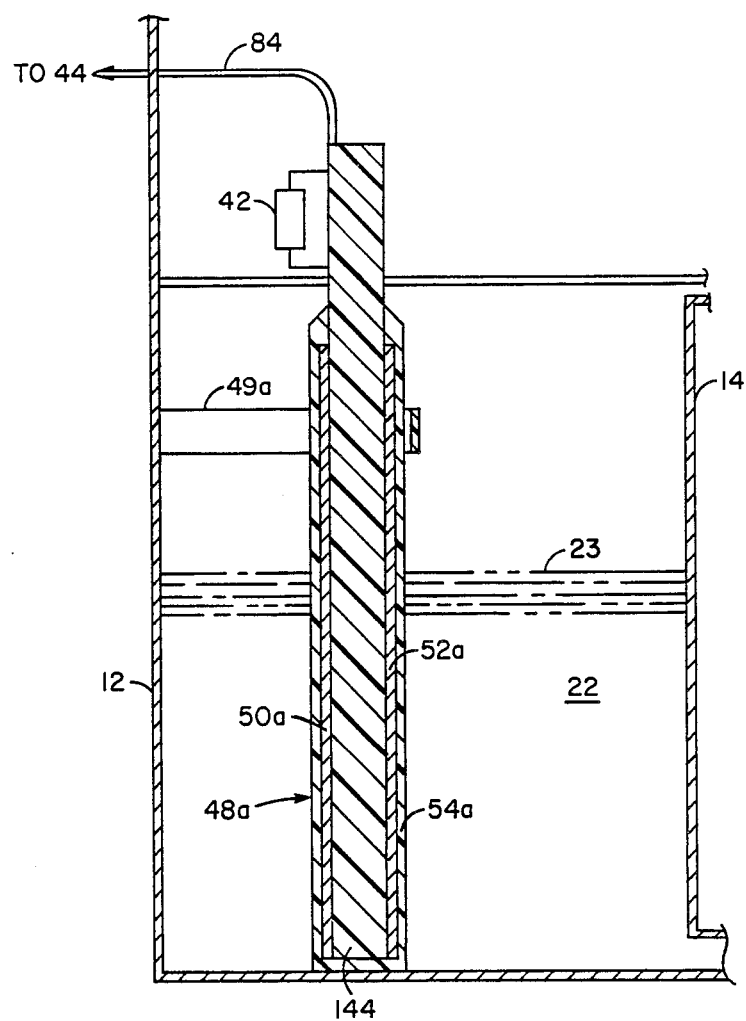
FIG. 7 shows a sectional view of an alternate embodiment of the liquid level sensor shown in FIG. 1.

Referring to FIG. 7, there is shown an alternate embodiment of the liquid level sensor 48a vertically mounted between tank 12 and basket 14 with mounting bracket 49a. Liquid level sensor 48a includes a printed circuit board 144 having a plate or metal strip 50a on the surface of one side and a plate or metal strip 52a on the surface of the other side of circuit board 144. Metal strips 50a and 52a and printed circuit board 144 are coated with a non-corrosive material 54a such as Teflon to prevent any soap film 23 from liquid 22 from attaching to liquid level sensor 48a. The liquid level sensor preferably has dimensions of 15" high × 1.5" wide × ⅛" thick.

Mounted near the top of liquid level sensor and connected to metal strips 50a and 52a is frequency generation circuitry 42. Metal strip 50a is connected through control circuitry 44 on circuit board 144 to GND. Power (5V) is provided to control circuitry 44 on circuit board 144 from a power supply (not shown) located in the washing machine chassis. The output of frequency generation circuitry 42 is connected through line 84 to flow and timer control circuitry 44. During operation, the average dielectric constant around metal strips 50a and 52a changes as the liquid 22 level in the tub 12 rises and falls. This change in dielectric constant results in the frequency signal from frequency generation circuitry 42 to change its period. Flow and timer control circuitry 44 responds to the changes in the frequency signal as previously described. It is recognized that the capacitance of the metal strips 50a and 52a can vary by changing the average dielectric constant due to the level of the liquid around the metal strips and not changing the dielectric constant of the material between the metal strips. It is further recognized by coating the strips with a non-stick, a non-porous and a non-corrosive material 54a such as Teflon or fluoroplastic, the sensor 48a capacitance is impervious to soap film 23.

This concludes the Description of the Preferred Embodiments. A reading of those skilled in the art will bring to mind many modifications and alternatives without departing from the spirit and scope of the invention. Accordingly, it is intended that the invention only be limited by the following claims.

What is claimed is:

1. An apparatus for sensing the level of liquid in a container comprising:
    first and second parallel metal plates having opposingly facing flat surfaces and providing a capacitance;
    means for supporting said plates inside said container;
    insulating spacing means, attached to said first and second plates for maintaining a constant spacing between said first and second plates; and
    means electrically coupled to said plates for detecting said capacitance and for generating in response to said capacitance a signal indicating the level of liquid in said container;
    wherein said first and second parallel metal plates are shaped to support said detecting and signal generating means.

2. The apparatus as recited in claim 1 wherein each of said first and second plates has a portion perpendicular to said opposingly facing flat surface, said portion supporting said detecting and signal generating means.

3. The apparatus as recited in claim 1 further comprising a corrosion resistant coating means for encasing said metal plates.

4. The apparatus as recited in claim 1 wherein said means for supporting said plates inside said container supports said plates in a vertical position.

5. A washing machine comprising:
an outer tub;
an inner tub disposed within said outer tub;
an agitator positioned in said inner tub;
means for driving said agitator; and
means for sensing the level of liquid in said outer tub, said sensing means comprising:
   (a) first and second parallel metal plates having opposingly facing flat surfaces;
   (b means for supporting said plates inside said outer tub;
   (c) insulating spacing means, attached to said first and second plates, for maintaining a constant spacing between said first and second plates; and
   (d) means attached to a portion of said first and second plates for generating a signal indicating the level of liquid in said tub.

6. The washing machine as recited in claim 5 further comprising means for displaying the level of liquid in said outer tub in response to said frequency.

7. The washing machine recited in claim 5 wherein said signal has a frequency proportional to the level of the liquid in said outer tub.

8. The washing machine recited in claim 5 further comprising means, responsive to said signal for adjusting the level of liquid within said outer tub.

9. The washing machine recited in claim 5 wherein said first and second plates are spaced by greater than approximately 0.0625 inches and less than approximately 0.125 inches.

10. The washing machine recited in claim 5 wherein said first and second plates are coated with a "TEFLON" material.

11. The washing machine recited in claim 5 wherein said signal generating means is mounted on a printed circuit board.

12. The washing machine recited in claim 11 wherein said first and second plates are shaped to support said circuit board.

13. The washing machine recited in claim 5 wherein said first and second plates are mounted within said outer tub to contact said liquid.

14. A method of sensing the level of liquid in a washing machine comprising the steps of:
positioning first and second parallel metal plates having opposingly facing flat surfaces in a substantially vertical position within the liquid within said machine;
coating said plates with a non-corrosive material;
maintaining a constant spacing by an insulating spacer between said first and second plates of less than approximately 0.5 inches;
sensing the capacitance between the first and second plates;
generating a signal having a frequency proportional to the level of liquid in said washing machine in response to said capacitance; and
attaching a circuit board to said metal plates, said circuit board containing circuitry that senses the capacitance between said first and second plates and generates said signal.

15. The method as recited in claim 14 wherein said first and second plates are spaced by less than approximately 0.5 inches.

16. The method as recited in claim 14 further comprising the step of controlling the level of liquid in said machine in response to said signal.

17. The apparatus as recited in claim 14 further comprising the steps of:
determining a time period corresponding to the frequency of said signal;
comparing said time period to a pre-stored value; and
changing the level of liquid in said washing machine in response to said comparison.

18. The method as recited in claim 14 further comprising the step of displaying the changes in the level of liquid in said washing machine in response to said signal.

* * * * *